(12) United States Patent
Grübler et al.

(10) Patent No.: US 11,097,858 B2
(45) Date of Patent: Aug. 24, 2021

(54) SATELLITE COVER PANEL

(71) Applicant: Technische Universität München, Munich (DE)

(72) Inventors: Thomas Grübler, Munich (DE); Martin Langer, Munich (DE)

(73) Assignee: Technische Universität München, Munich (DE)

( * ) Notice: Subject to any disclaimer, the term of this patent is extended or adjusted under 35 U.S.C. 154(b) by 547 days.

(21) Appl. No.: 16/042,454

(22) Filed: Jul. 23, 2018

(65) Prior Publication Data

US 2019/0023423 A1  Jan. 24, 2019

(30) Foreign Application Priority Data

Jul. 21, 2017 (EP) .................................. 17182497

(51) Int. Cl.
| | | |
|---|---|---|
| *B64G 1/10* | (2006.01) | |
| *B64G 1/22* | (2006.01) | |
| *B64G 1/44* | (2006.01) | |
| *B64G 1/42* | (2006.01) | |

(52) U.S. Cl.
CPC ............... *B64G 1/222* (2013.01); *B64G 1/10* (2013.01); *B64G 1/425* (2013.01); *B64G 1/44* (2013.01); *B64G 1/443* (2013.01); *B64G 2001/1092* (2013.01)

(58) Field of Classification Search
CPC .......... B64G 1/222; B64G 1/10; B64G 1/425; B64G 1/44; B64G 1/443; B64G 2001/1092
See application file for complete search history.

(56) References Cited

U.S. PATENT DOCUMENTS

| | | | | |
|---|---|---|---|---|
| 7,474,249 | B1* | 1/2009 | Williams | B64G 1/428 |
| | | | | 342/25 R |
| 7,963,397 | B2* | 6/2011 | Seagle | B65D 19/18 |
| | | | | 206/600 |
| 2014/0039729 | A1* | 2/2014 | Puig-Suari | B64G 1/10 |
| | | | | 701/3 |
| 2018/0141684 | A1* | 5/2018 | Leonard | B64G 1/66 |

FOREIGN PATENT DOCUMENTS

| | | |
|---|---|---|
| EP | 1559649 | 8/2005 |
| EP | 2386489 | * 11/2011 |

OTHER PUBLICATIONS

European Search Report, European Application No. EP 17182497, dated Jan. 26, 2018, 2 pages.
European Search Opinion, European Application No. EP 17182497.2, dated Jan. 26, 2018, 4 pages.
Decision to Grant, European Application No. 17182497.2, dated Aug. 16, 2019, 2 pages.
Amendments made in prosecution of European Application No. EP 17182497.2, filed on May 14, 2018.

* cited by examiner

*Primary Examiner* — Justin M Benedik
(74) *Attorney, Agent, or Firm* — Patterson Thuente Pedersen, PA (57) ABSTRACT

Embodiments described herein include a satellite cover panel for covering a satellite, particularly a payload bay of a satellite comprising an energy storage module, at least one energy generating module defining, at least partially, a first outer surface of the satellite cover panel, and a logic board defining, at least partially, a second outer surface of the satellite cover panel, wherein the first outer surface and the second outer surface face away from each other and from the energy storage module.

15 Claims, 5 Drawing Sheets

SATELLITE COVER PANEL

RELATED APPLICATION

The present application claims priority to EP Application No. 17182497.2 filed Jul. 21, 2017, which is hereby incorporated herein in its entirety by reference.

TECHNICAL FIELD

The invention regards a satellite cover panel. Further, the invention regards a satellite comprising at least one satellite cover panel. The satellite cover panel allows covering a satellite, particularly a payload bay of a satellite.

BACKGROUND

From the prior art, satellites are known which comprise several subsystems. The subsystems are connected according to a satellite bus via cable harness and/or plug connection. Such subsystems particularly comprise an energy supply subsystem, a main control subsystem, an attitude control subsystem, and a communication subsystem.

Such a design requires a lot of room inside the satellite such that either the payload mass is reduced and/or the volume and/or weight of the satellite increases, which leads to increased costs when transporting the satellite to space. Further, all subsystems are implemented and manufactured individually. This also leads to the drawback that features of different subsystems cannot cooperate easily to increase the redundancy and/or computing capacity.

Further, a satellite cover panel according to the preamble portion of claim 1 is known from US 2014/039729 A1, from EP 2 386 489 A2 and from EP 1 559 649 A1. Additionally, U.S. Pat. No. 7,474,249 B1 discloses an integrated cell unit including a solar power generator, a battery, and a processor.

SUMMARY

An object of the invention is to provide a satellite cover panel, which is simple to manufacture, which protects the payload, which provides major/some/all features of a satellite bus and which allows increasing the payload volume.

The solution of this object is provided by the features of independent claim 1, in one embodiment. The dependent claims contain advantageous embodiments of the present invention.

The object is therefore solved by a satellite cover panel for covering a satellite, particularly a payload bay of a satellite comprising an energy storage module, at least one energy generating module, preferably at least one solar cell, and a logic board. The energy generating module defines, at least partially, a first outer surface of the satellite cover panel. The logic board on the other side defines, at least partially, a second outer surface of the satellite cover panel. The first outer surface and the second outer surface face away from each other and from the energy storage module. Therefore, the energy generating module and the logic board each are provided on an outer side of the satellite cover panel, while the energy storage module is provided in between the energy generating module and the logic board. The energy storage module allows radiation protection of the interior space of the satellite, particularly of the payload bay covered by the satellite cover panel. In a preferred embodiment of the invention, the energy storage module holds the at least one energy generating module and the logic board. This leads to a stiff and solid design of the satellite cover panel. The satellite cover panel therefore helps to reinforce the design of a satellite provided with the satellite cover panel. Particularly, the first outer surface and the second outer surface cover the same area or differ in area of at most 20%, preferably at most 10%. The energy storage module preferably does not extend over the edges of the first outer surface or the second outer surface. In this way, a panel is provided which can be used as any ordinary cover panel. However, the satellite cover panel includes functionality which at least partially can replace the subsystems provided in an ordinary satellite. Therefore, the payload volume is increased since less or no conventional subsystems are required when adopting the satellite cover panels according to the present invention.

In a preferred embodiment, the dimensions of the first outer surface and the second outer surface are larger than a thickness measured between the first outer surface and the second outer surface. In this way, a panel shape is realized. The first outer surface and the second outer surface therefore are the largest surfaces of the satellite cover panel. The satellite cover panel can have the same dimensions than any ordinary cover panel. For instance, the satellite cover panel can have a minimum size of 5 cm×5 cm, wherein the thickness is less than 20%, preferably less than 10% of the side length. Preferably, the energy generating module comprises one or two or more solar cells, wherein each solar cell may have a dimension of 4 cm×8 cm with a thickness smaller than 1 mm. Those dimensions are common for satellites, such that particularly standard solar cells can be adopted for the satellite cover panel.

The energy storage module preferably is a battery, particularly a structurally integrated battery. Due to the battery's layer composition, an improved radiation protection is established. Therefore, the satellite cover panel can efficiently cover a payload and/or other sections of interior space of the satellite and protect the payload and/or other sections of interior space of the satellite from radiation. The battery preferably has a flat shape such that the satellite cover panel also has a flat shape. Particularly by using structurally integrated batteries, the satellite cover panel can have a flat design while at the same time being built in a solid way. In order to further increase the radiation protection, the satellite cover panel may comprise at least one further radiation shield layer, which might be provided between the at least one energy generating module and the energy storage module and/or between the energy storage module and the logic board. The energy storage module may comprise one, two or more energy storage devices, particularly one, two or more batteries.

The logic board preferably comprises at least one sensor for detecting an orientation of at least one axis of the satellite cover panel. The sensor allows attitude determination to realize attitude control of the whole satellite regarding at least one axis of the satellite. For attitude control, data of sensors of logic boards from at least two different satellite cover panels might be combined. Further, the sensor preferably allows self-configuration after the satellite cover panel is provided to the satellite. In case more than one satellite cover panel are provided, redundancy is increased since each sensor can independently detect an orientation of the satellite cover panel and therefore of the satellite.

Additionally or alternatively, the logic board preferably comprises an attitude control system for controlling an orientation of the satellite cover panel. Again, redundancy and simultaneously controllable axis number can be increased by providing more than one satellite cover panels. Favorably, the attitude control system includes a magnetic field based actuator system.

In another preferred embodiment, the logic board comprises a microprocessor. The microprocessor is a main control unit which allows controlling the functionality of the satellite equipped with the satellite cover panel and/or a payload of the satellite. Again, the redundancy can be increased by providing more than one satellite cover panel. Instead of redundancy, performance of the microprocessor can be increased by combining several microprocessors of the satellite cover panels. In order to connect satellite cover panels among each other, the logic board particularly comprises a connecting element. The connecting element is adapted to connect the logic board to another logic board and/or to a payload provided in the payload bay. Therefore, the satellite bus according to the prior art definition is completely provided in the cover panels of the satellite. This increases the volume of the payload such that the satellite is more efficient.

The satellite cover panel favorably is symmetrical with respect to a center axis perpendicular to the satellite cover panel. Said center axis particularly extends perpendicular to the first outer surface and the second outer surface.

Preferably, the satellite cover panel comprises at least one connection means on at least one outer side, preferably on each outer side for connecting the logic board and/or the energy storage module to a logic board and/or to an energy storage module of another/other satellite cover panel(s) and/or to a payload provided in the payload bay.

The satellite cover panel preferably comprises a holding element having a first portion and a second portion connected via a hinge. This design allows folding and unfolding the holding element. The first portion may hold the at least one energy generating module, which defines, at least partially, the first outer surface. The second portion may hold at least one additional energy generating module. In case the holding element is folded, the first portion and the second portion are facing each other. Accordingly, the at least one energy generating module defining, at least partially, the first surface is covered by the second portion of the holding element. In case the holding element is unfolded, the surface for providing energy generating modules is increased, such that an increased generation of energy is possible.

The invention further regards a satellite comprising a frame, according to an embodiment. The satellite comprises at least one satellite cover panel as described above. The at least one satellite cover panel is mounted to the frame to set up an outer surface of the satellite. Therefore, the frame preferably is covered by the satellite cover panels. The satellite cover panels particularly are the only elements visible from outside the satellite. In a preferred embodiment of the invention the satellite comprises at least two, more preferably at least three and most preferably at least four satellite cover panels as described above.

Preferably, in a mounted state the first outer surface of each satellite cover panel faces away from the frame. Additionally or alternatively, in a mounted state the second outer surface of each satellite over panel faces towards the frame. The first outer surface comprises the at least one energy generating module, preferably the at least one solar cell. This energy generating module therefore allows providing the satellite with energy. The energy is stored within the energy storage module of each satellite cover panel and can be supplied to the payload and/or to the logic board of the satellite cover panel.

Preferably, the logic boards of at least some of all satellite cover panels are interconnected. Therefore, the satellite cover panels are electrically coupled. This allows exchanging data between the logic boards of the satellite cover panels. The interconnection allows increased redundancy on the one hand and/or increased performance on the other hand. Therefore, the satellite comprising the satellite cover panels according to the invention can be set up in a very flexible and scalable way. It is possible to increase redundancy by controlling the microprocessors and/or sensors and/or attitude control systems individually. In this case, damage or failure of one of these components does not lead to failure of the whole satellite. On the other hand, several microprocessors can be combined to increase the calculation performance. This allows employing rather cheap hardware with low performance, since the combination of the microprocessors leads to increased performance. Further, in case an increased performance is not needed, it is possible to activate and deactivate single logic boards or whole satellite cover panels on demand. Independent from single logic boards or whole satellite cover panels being active or inactive, the satellite cover panels preferably all the time ensure at least partial radiation protection and cover of the payload.

In addition or alternatively, the energy storage modules of at least some of all satellite cover panels may be interconnected. The interconnection allows increased redundancy on the one hand and/or increased energy storage capacity on the other hand. In case an increased energy storing capacity is not needed, it is possible to activate and deactivate single energy storage modules or whole satellite cover panels on demand. Independent from the energy storage module or the whole satellite cover panel being active or inactive, the satellite cover panels all the time ensure radiation protection and cover of the payload.

Preferably, the satellite cover panels are fixed to each other to stiffen the frame. Therefore, the satellite cover panels may be mechanically coupled. The frame itself does not have to bear the entire load generated by the payload. Therefore, the satellite is very solid and insensitive against mechanical influences.

The radiation protection provided by the satellite cover panel and/or the increased redundancy allows employing logic bards that include components which are not specifically designed for use in space. This simplifies manufacturing of the logic boards and of the satellite cover panels and reduces the manufacturing costs.

The frame preferably defines a payload bay, in which a payload can be provided. The at least one satellite cover panel is mounted to the frame to cover the payload bay. The payload bay is at least partially covered by satellite cover panels as described above. Particularly, the payload bay might require an opening to allow receiving data from outside. This might be the case if the payload is a camera; the lens system should not be covered or concealed by the satellite cover panel. Such an opening can be established by not providing a satellite cover panel to a respective portion of the frame.

Preferably, in a mounted state the first outer surface of each satellite cover panel faces away from the payload bay. Additionally or alternatively, in a mounted state the second outer surface of each satellite over panel faces towards the payload bay. Therefore, the first outer surface, which includes the at least one energy generating module, preferably the at least one solar cell, is arranged to face an outside of the satellite. This allows the energy generating module(s) generating energy from luminous energy.

The satellite may also comprise cover panels other than the above described cover panels. In this case, these cover panels may not provide any further function. There might be cover panels provided for radiation protection only. That means, the satellite can comprise ordinary cover panels according to the prior art. Preferably, the different cover panels can all be exchanged with each other. Particularly, the above described satellite cover panel can be exchanged with any ordinary cover panel. This allows an effective mass production of satellites such that the manufacturing costs of satellites are reduced.

BRIEF DESCRIPTION OF THE DRAWINGS

Further details and advantages of the invention are described together with the attached drawings. In the drawings.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
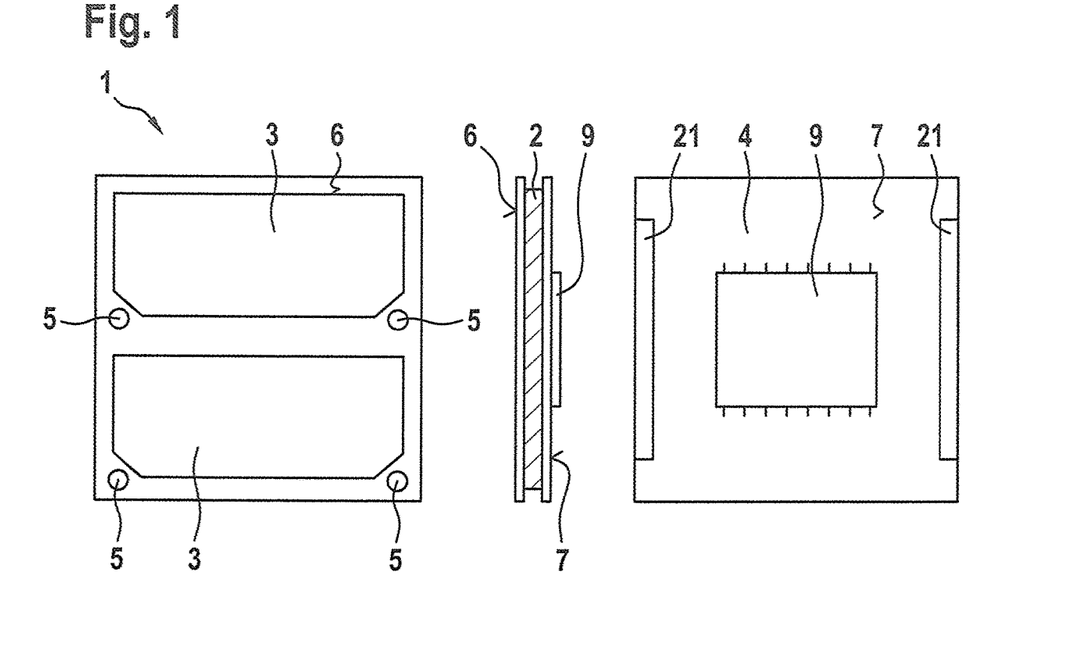
FIG. 1 is a schematic view of a satellite cover panel according to a first embodiment of the invention from three different sides.

FIG. 1 is a schematic view of a satellite cover panel 1 according to a first embodiment of the invention from three different sides. The satellite cover panel 1 has a flat shape and comprises a battery 2, which is an energy storage device, solar cells 3, which are an energy generating module, and a logic board 4. The solar cells 3 define at least partially a first outer surface 6 of the satellite cover panel 1, while the logic board 4 defines a second outer surface 7 of the satellite cover panel 1. The area of the first outer surface 6 and the second outer surface 7 is identical. Further, each dimension of the first outer surface 6 and the second outer surface 7 is larger than a thickness of the satellite cover panel 1 measured between the first outer surface 6 and the second outer surface 7. In this way, the flat shape is realized.

The battery 2 preferably is a structurally integrated battery, which holds the solar cells 3 and the logic board 4. The battery 2 is composed of several layers and therefore allows radiation protection. This can be further increased by providing a radiation shield between the battery 2 and the solar cells 3. In this way, the satellite cover panel 1 can protect a payload 15 (see FIG. 5) of a satellite from failure or being damaged due to radiation.

The solar cells 3 supply electrical energy to the battery 2. The battery 2 stores the electrical energy and supplies it to the logic board 4 and/or the payload 15. The logic board 4 therefore is electrically connected with the battery 2. The logic board 4 further comprises a connecting element 8 for connecting the logic board 4 to the payload. In this way, the payload 15 can be supplied with power.

The connecting element 8 also allows connecting the logic board 4 to a logic board 4 of another satellite cover panel 1. In this way, two satellite cover panels 1 can be coupled. This leads to increased battery capacity, increased redundancy and/or increased performance of the logic boards 4.

The logic board 4 comprises a microprocessor 9, which is a main control unit for controlling a satellite 10 (see FIG. 2) equipped with the satellite cover panel 1. Further, the logic board 4 comprises sensors 5 and a not shown attitude control system. The sensors 5 extend through the first outer surface and therefore have access to an outside of the satellite 10. The sensors 5 particularly might determine an orientation of at least one axis of the satellite cover panel 1 and therefore of the satellite 10. As described above, in case more than one satellite cover panel 1 are provided, redundancy is increased such that failure of one of the sensors 5 does not lead to failure of the whole satellite.

In FIGS. 2, 3, 4, and 5, different embodiments of a satellite 10 are shown. In a first embodiment shown in FIG. 2, the satellite 10 comprises six satellite cover panels 1, wherein one of the satellite cover panels 1 is not shown. The satellite cover panels 1 are mounted to a frame 12 but are also mechanically coupled in order to stiffen the frame 12. Therefore, the satellite 10 is built in a very solid way.

Figure 2:
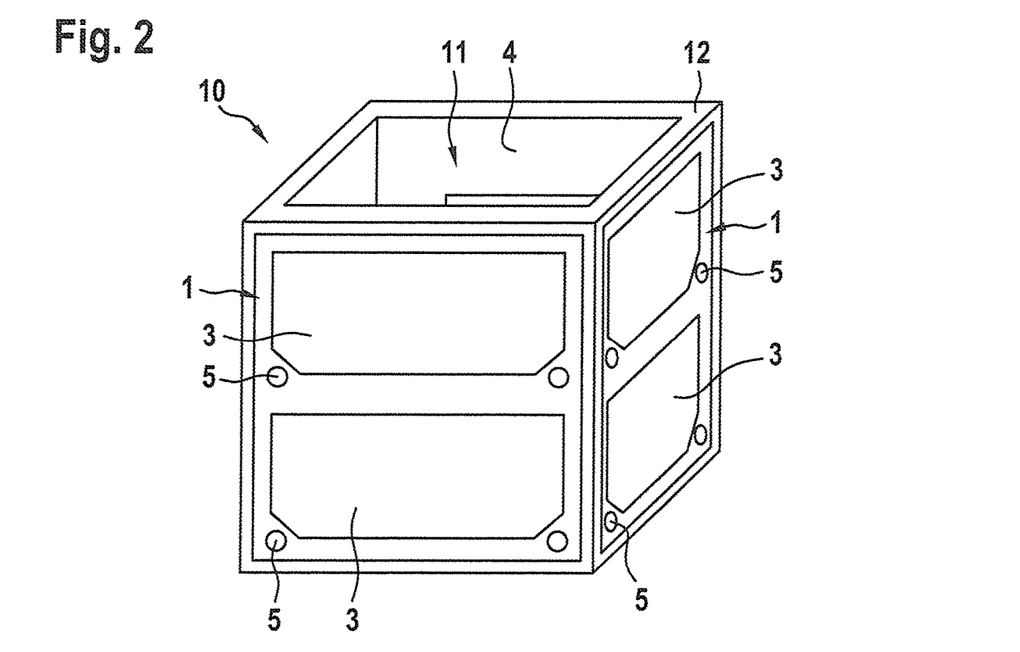
FIG. 2 is a schematic view of a satellite according to a first embodiment of the invention.

The satellite cover panels 1 are mounted such that the solar cells 3 face towards an outside of the satellite 10, while the logic boards 4 face towards a payload bay 11 inside the satellite 10. The solar cells 3 therefore can generate electrical energy to charge the batteries 2, while the batteries 2 can supply energy to a payload (not shown) provided inside the payload bay 11.

The logic boards 4 are electrically connected via the connecting elements 8. Therefore, the above described advantages regarding redundancy and performance apply. Particularly, the satellite is insensitive against failure of single components like single batteries 2, single solar cells 3 and/or single logic boards 4. Further, the satellite 10 can be controlled such that single satellite cover panels 1 are activated or deactivated on demand. Therefore, the overall battery capacity or processing power can be increased or reduced on demand.

In the first embodiment, the satellite can have the dimensions of about 10 cm×10 cm×10 cm. This is the lowest size for carrying two of space-standard solar cells 3 which have a dimension of 4 cm×8 cm. However, the design of the satellite 10 is scalable as shown in FIGS. 3 to 5.

Figure 3:
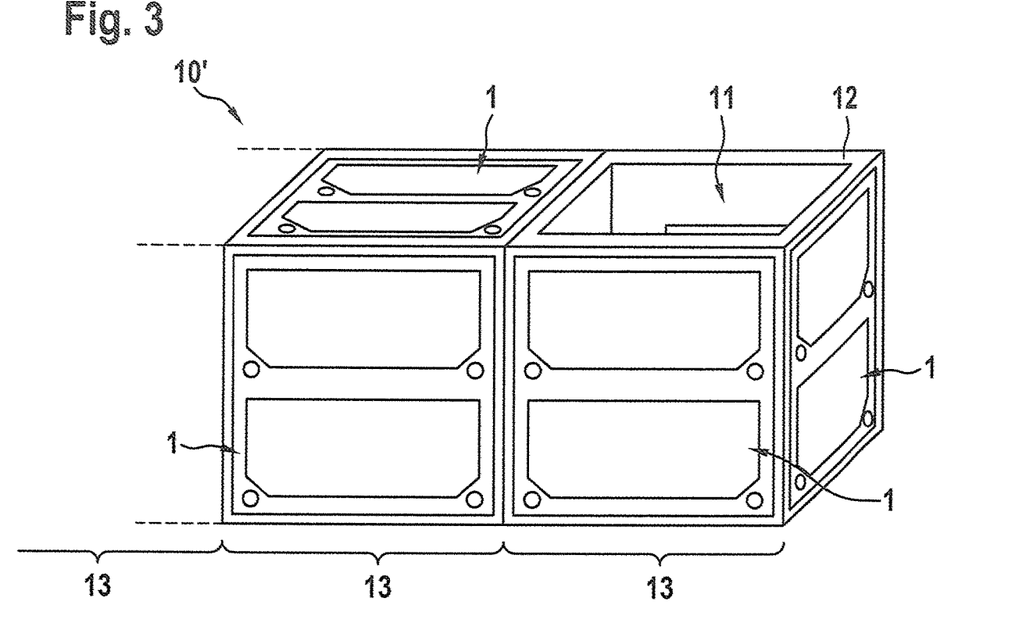
FIG. 3 is a schematic view of a satellite according to a second embodiment of the invention.

FIG. 3 is a schematic view of a satellite 10' according to a second embodiment of the invention. The satellite 10' comprises several modules 13, wherein each module 13 has the dimensions of the satellite 10 according to the first embodiment shown in FIG. 2. By adding further satellite cover panels 1, redundancy and performance is further increased.

Figure 4:
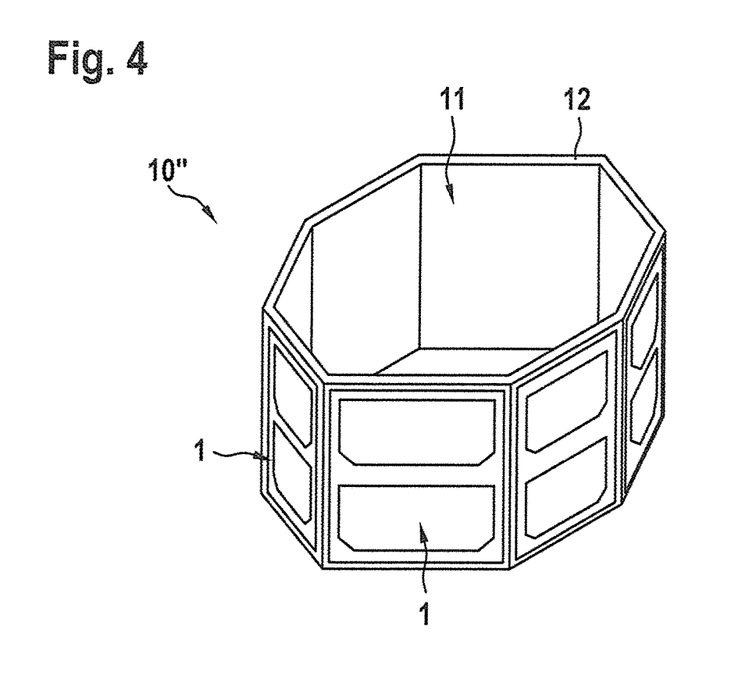
FIG. 4 is a schematic view of a satellite according to a third embodiment of the invention.

FIG. 4 is a schematic view of a satellite 10" according to a third embodiment. In this embodiment, a number of eight satellite cover panels 1 are provided around the payload bay 11. The top and bottom surface of the satellite 1 might be left open to allow the payload, e.g. a camera, having free view out of the satellite 10" or might be covered with a conventional cover member.

Figure 5:
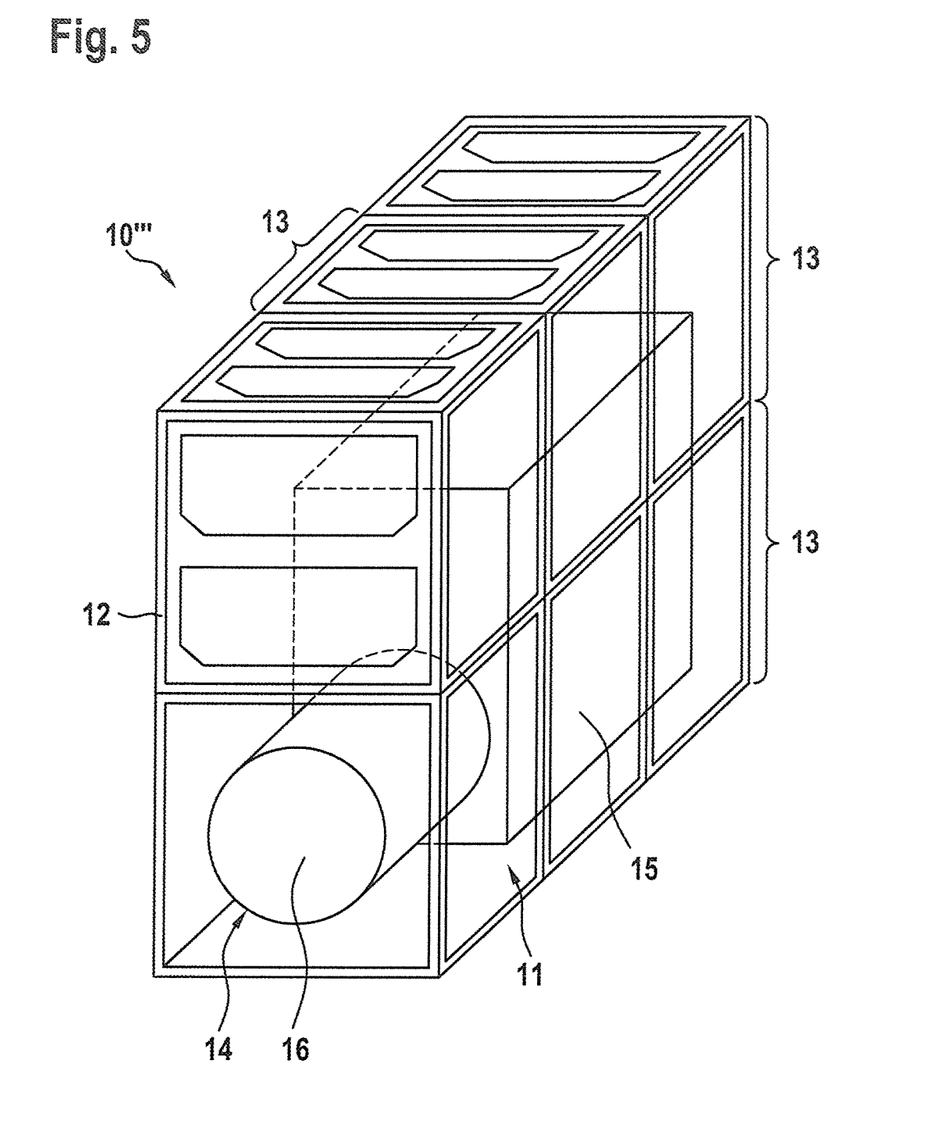
FIG. 5 is a schematic view of a satellite according to a fourth embodiment of the invention.

In FIG. 5, a satellite 10''' according to a fourth embodiment of the invention, which includes a payload 15 is shown. Again, the satellite 10''' comprises several modules 13 as shown in FIG. 3. In FIG. 5, not all satellite cover panels 1 are shown in order to illustrate the payload 15. The only part of the satellite 10''' not covered by satellite cover panels 1 is the opening 14. The opening 14 is required to allow a lens system 16 of the payload 15 to view out of the payload bay 11. Such an opening 14 can therefore be provided in a simple manner by not covering the respective part of the satellite 10 by a satellite cover panel 1.

The main advantage of the satellite cover panel 1 is the scalable design of satellites 10 equipped with such satellite cover panels 1. Further, the satellite 10 can be designed in a modular way. Redundancy and performance as well as battery capacity are increased by including a further satellite cover panel 1. Additionally, the satellite cover panel 1 can be provided like any ordinary cover panel such that the manufacturing process of the satellite 10 is rather simple and cost saving. This even allows satellite mass production to further reduce costs and manufacturing time.

Figure 6:
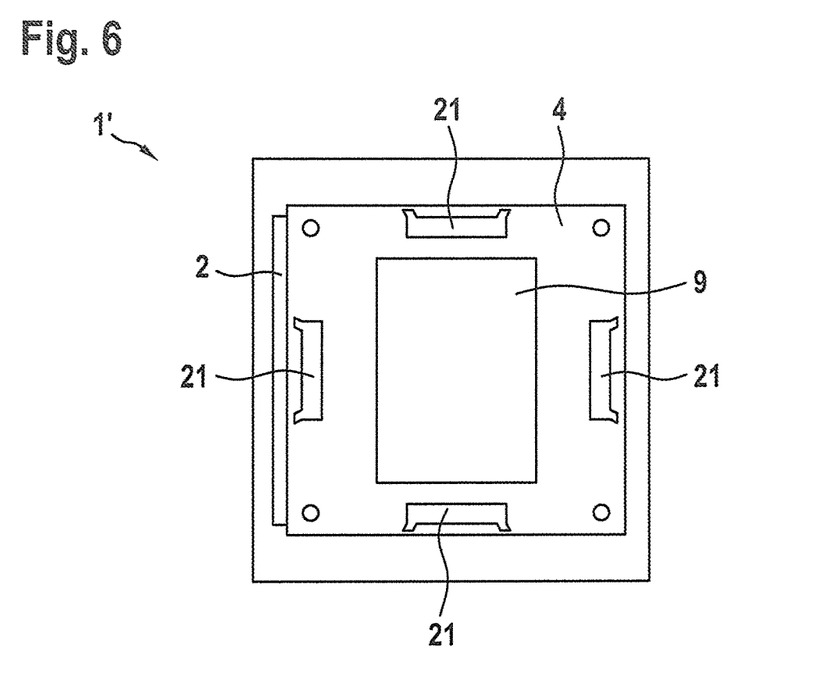
FIG. 6 is a schematic view of a satellite cover panel according to a second embodiment of the invention.

FIG. 6 is a schematic view of a satellite cover panel 1' according to a second embodiment of the invention. The second embodiment differs from the first embodiment only in that the satellite cover panel 1' is symmetrical to a center axis (not shown) perpendicular to the satellite cover panel 1' (i.e. perpendicular to the drawing plane). This means that the center axis is perpendicular to the first outer surface 6 and the second outer surface 7. The satellite cover panel 1' further comprises four connection means 21 for interconnecting the logic board 4 and/or the energy storage module 2 to logic boards 4 and/or energy storage modules 2 of adjacent satellite cover panels 1' (not shown) and/or the payload of a satellite comprising said satellite cover panel 1'.

Figure 7:
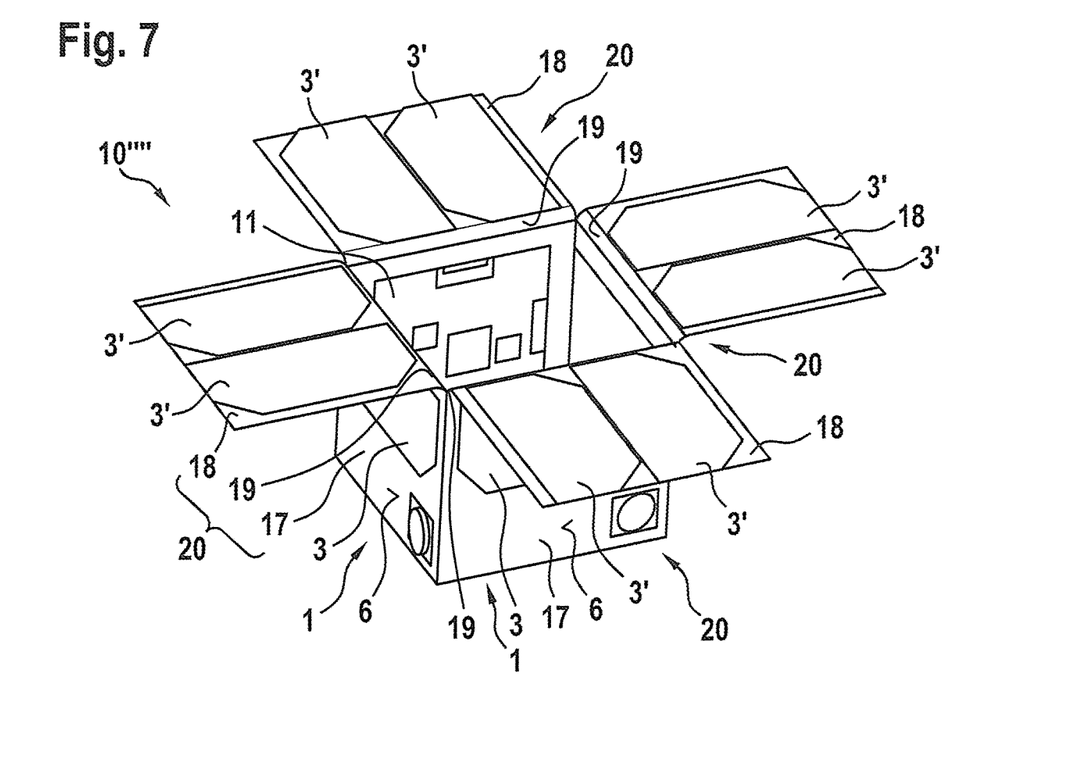
FIG. 7 is a schematic view of a satellite according to a fifth embodiment of the invention.

FIG. 7 is a schematic view of a satellite 10'''' according to a fifth embodiment of the invention. The fifth embodiment is basically identical to the first embodiment as shown in FIG. 2. However, in the fifth embodiment, the satellite cover panel 1 comprises a holding element 20 having a first portion 17, a second portion 18, and a hinge 19 connecting the first portion 17 and the second portion 18. This allows folding and unfolding of the holding element 20.

Figure 8:
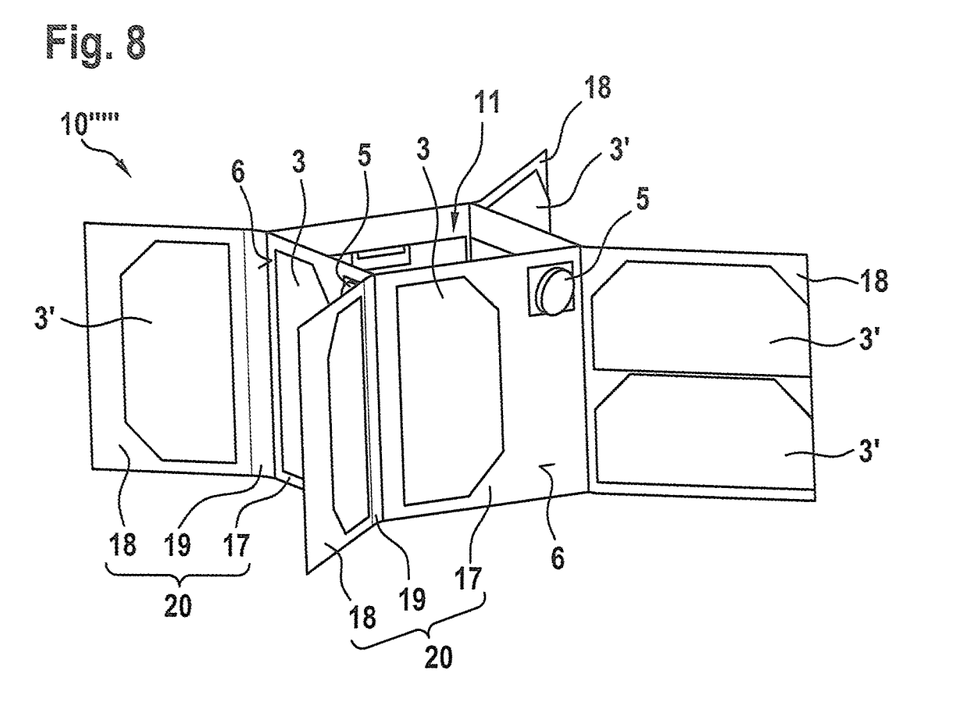
FIG. 8 is a schematic view of a satellite according to a sixth embodiment of the invention.

The first portion 17 comprises energy generating modules 3 which at least partially define the first outer surface 6. The second portion 18 comprises further energy generating modules 3', which do not define the first outer surface 6. Due to such a design, the energy generating capacity is increased since the total number of energy generating modules 3, 3' is increased. The satellite 10'''' according to the fifth embodiment is preferable adapted to point the second portions 18 comprising the further energy generating modules 3' directly towards the sun. Hence, the further energy generating modules 3' are placed for optimal energy generation. The holding element 20 can be transferred to a folded state, in which the first portions 17 and the second portion 18 face each other. In this state, the satellite 10'''' according to the fifth embodiment maintains the cubic shape like in the first embodiment. In an unfolded state, the satellite 10'''' according to the fifth embodiment is transferred to a shape as shown in FIG. 7. FIG. 8 is a schematic view of a satellite 10'''' according to a sixth embodiment of the invention. The sixth embodiment differs from the fifth embodiment only in that the hinge 19 is orientated in a different way. This allows the second portions 18 to be folded such that they face away from all first portions 17, i.e. even those first portions 17 the respective second portion 18 is not connected to. This allows converting the satellite 10'''' to a so called x-wing configuration. The x-wing configuration allows optimized energy generation via the energy generating modules 3, 3' without transferring the satellite 10'''' to a specific orientation towards the sun.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

LIST OF REFERENCE NUMERALS 1, 1' satellite cover panel
2 energy storage module
3, 3' energy generating module (solar cell)
4 logic board
5 sensors
6 first outer surface
7 second outer surface
8 connecting element
9 microprocessor 10, 10', 10", 10'", 10"", 10""' satellite
11 payload bay
12 frame
13 module
14 opening
15 payload (camera)
16 lens system
17 first portion
18 second portion
19 hinge
20 holding element
21 connection means

The invention claimed is:

1. A satellite cover panel for covering a satellite, the satellite cover panel comprising:
    an energy storage module,
    at least one energy generating module defining, at least partially, a first outer surface of the satellite cover panel,
    a logic board defining, at least partially, a second outer surface of the satellite cover panel,
    characterized in that the first outer surface and the second outer surface face away from each other and from the energy storage module and the energy storage module is provided between the energy generating module and the logic board.

2. The satellite cover panel according to claim 1, characterized in that the dimensions of the first outer surface and the second outer surface are larger than a thickness measured between the first outer surface and the second outer surface.

3. The satellite cover panel according claim 1, characterized in that the energy storage module is a structurally integrated battery.

4. The satellite cover panel of claim 1, wherein the logic board comprises:
    at least one sensor configured to detect an orientation of the satellite cover panel and
    an attitude control system configured to control an orientation of the satellite cover panel.

5. The satellite cover panel of claim 1, wherein the logic board comprises at least one of:
    a microprocessor,
    a connecting element for connecting the logic board to another logic board, and
    a connecting element for connecting the logic board to a payload provided in the payload bay.

6. The satellite cover panel of claim 1, wherein the satellite cover panel is symmetrical with respect to a center axis perpendicular to the satellite cover panel.

7. The satellite cover panel of claim 1, further comprising at least one connection means on at least one outer side of the satellite cover panel, wherein the at least one connection means is configured to:
    connect the logic board to a logic board of another satellite cover panel, or
    connect the energy storage module to an energy storage module of another satellite cover panel, or
    connect the logic board to a payload provided in the payload bay.

8. The satellite cover of claim 1, further comprising a holding element having a first portion and a second portion connected via a hinge configured to fold and unfold the holding element, wherein the first portion preferably holds the at least one energy generating module, which defines, at least partially, the first outer surface, and the second portion preferably holds at least one additional energy generating module.

9. A satellite comprising:
    a frame; and
    at least one satellite cover panel according claim 1, wherein the at least one satellite cover panel is mounted to the frame to set up an outer surface of the satellite.

10. The satellite according to claim 9, wherein the first outer surface of each satellite cover panel faces away from the frame and the second outer surface faces towards the frame.

11. The satellite according to claim 9, wherein the logic board corresponding to two of the at least one satellite cover panels are interconnected for establishing redundancy or increased performance.

12. The satellite according to claim 9, wherein the energy storage module corresponding to at least two of the at least one satellite cover panels are interconnected for establishing redundancy or increased performance.

13. The satellite according to claim 9, wherein at least two of the at least one satellite cover panels are fixed to each other to stiffen the frame.

14. Satellite according to claim 9, wherein the frame defines a payload bay, and wherein the at least one satellite cover panel is mounted to the frame to cover the payload bay.

15. The satellite according to claim 14, wherein the first outer surface of each satellite cover panel faces away from the payload bay and the second outer surface of each satellite cover panel faces towards the payload bay.

\* \* \* \* \*